United States Patent [19]

Kumagai et al.

[11] Patent Number: 5,104,084
[45] Date of Patent: Apr. 14, 1992

[54] SEAT-SLIDING DEVICE FOR FRONT SEAT OF VEHICLE

[75] Inventors: Toshiaki Kumagai; Youetsu Nagasaka, both of Kanagawa, Japan

[73] Assignee: Shiroki Corporation, Kanagawa, Japan

[21] Appl. No.: 587,449

[22] Filed: Sep. 25, 1990

[30] Foreign Application Priority Data

| Mar. 16, 1989 | [JP] | Japan | 2-26413[U] |
| Feb. 1, 1990 | [JP] | Japan | 2-9557[U] |
| Feb. 1, 1990 | [JP] | Japan | 2-9558[U] |
| Feb. 1, 1990 | [JP] | Japan | 2-9559[U] |
| Feb. 1, 1990 | [JP] | Japan | 2-22814 |
| Feb. 1, 1990 | [JP] | Japan | 2-22815 |

[51] Int. Cl.$^5$ ............................................. F16M 13/00
[52] U.S. Cl. ............................................. 248/430
[58] Field of Search .............. 248/430, 429, 424, 420; 296/65.1

[56] References Cited

U.S. PATENT DOCUMENTS

| 4,114,947 | 9/1978 | Nelson . | |
| 4,378,101 | 3/1983 | Kazaoka et al. | 248/430 |
| 4,526,424 | 7/1985 | Korth | 248/430 X |
| 4,725,032 | 2/1988 | Kazaoka et al. | 248/430 |
| 4,776,551 | 10/1988 | Nishino | 248/430 X |
| 4,781,354 | 11/1988 | Nihei et al. | 248/429 |
| 4,821,991 | 4/1989 | Aihara et al. | 248/430 |
| 4,898,417 | 2/1990 | Kudo | 296/48.23 |

FOREIGN PATENT DOCUMENTS

| 0374748 | 5/1984 | Austria . | |
| 0283356 | 9/1988 | European Pat. Off. . | |
| 1680150 | 1/1977 | Fed. Rep. of Germany | 248/429 |
| 3807386 | 9/1989 | Fed. Rep. of Germany . | |
| 2571794 | 4/1986 | France . | |
| 63-270261 | 11/1988 | Japan . | |
| 0171660 | 2/1986 | United Kingdom . | |
| 2219493 | 12/1989 | United Kingdom . | |
| 2221152 | 1/1990 | United Kingdom . | |

OTHER PUBLICATIONS

English Abstract of Japanese Patent No. 63-270261.
European Search Report and Annex.
International Search Report and Annex.

Primary Examiner—Ramon O. Ramirez
Attorney, Agent, or Firm—Sandler, Greenblum & Bernstein

[57] ABSTRACT

The present invention provides a seat sliding device for the front seat of a vehicle. The seat sliding device, according to the invention, comprises a vehicle floor surface comprising a floor panel, a soundproof and a vibration-proof member mounted on the floor panel, and a surface layer member formed over the soundproof and vibration-proof member. A cutout portion is provided in the soundproof and vibration-proof member and in the surface layer member for exposing the floor panel, and is formed by linearly cutting out a predetermined portion of the soundproof and vibration-proof member. A linear lower rail is inserted through the linear cutout portion for direct securement thereof to the floor panel, and an upper rail is slidably received within the lower rail and fixed to the seat.

37 Claims, 17 Drawing Sheets

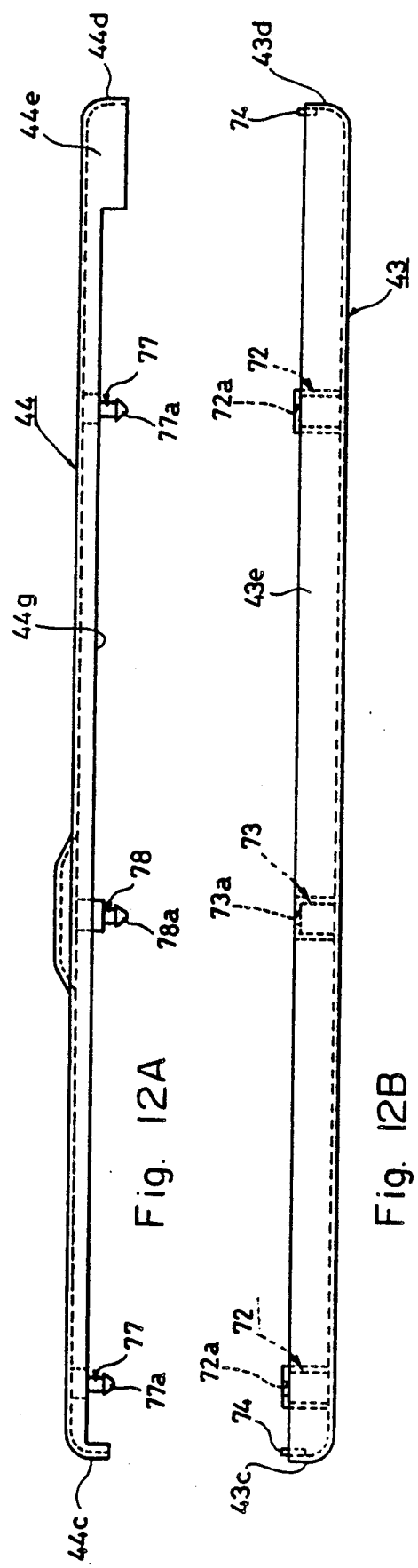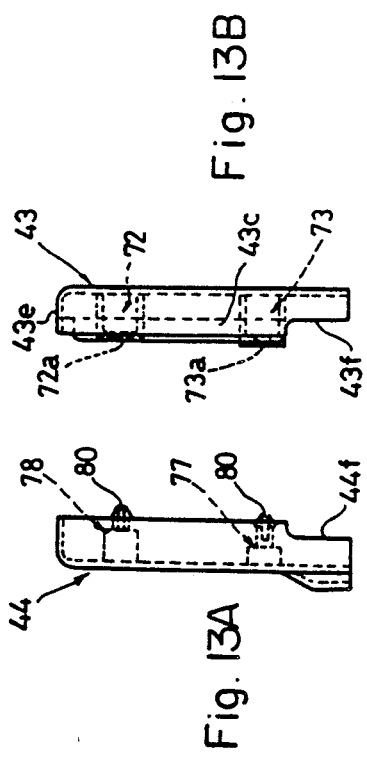

SEAT-SLIDING DEVICE FOR FRONT SEAT OF VEHICLE

BACKGROUND OF THE INVENTION

1. Field of the Invention

This invention generally relates to a seat-sliding device for a vehicle, and more particularly to a seat-sliding device for the front seat of a vehicle.

2. Description of Related Art

Generally, a seat-sliding device for the front seat of a vehicle includes a lower rail secured to a vehicle floor and an upper rail slidably inserted into the lower rail and fixed to the seat. The lower rail and upper rail themselves are generally in a linear configuration since they should be slidable relative to one another. In a prior art technique, the rails are attached to the vehicle floor surface by means of brackets attached to the forward end and rearward end of the lower rail, which brackets in turn are fixed to the vehicle floor. Such brackets have been considered necessary for raising the seat-sliding device to a predetermined distance above the floor, so as to rearwardly incline the seat sliding-device at a predetermined angle (approximately 5 degrees). Accordingly, the lower rail of the prior art seat sliding device is exposed in its entirety. This undesirable exposure of the lower rail has been considered unavoidable heretofore, due to the nature of the construction in which the seat sliding device is attached to the vehicle.

SUMMARY OF THE INVENTION

According to the present invention, exposure of the lower rail, which has been considered to be unavoidable in the prior art, is obviated by the structure of the seat sliding device of the invention.

The primary object of the invention is to provide means for preventing exposure of the lower rail so as to give a more sophisticated appearance and luxuriousness to the vehicle floor, as well as to provide sufficient space below the seat.

The present invention has been completed based on an idea of accomodating the lower rail below the vehicle floor surface. That is, the fact that the vehicle floor surface is comprised of a floor panel, a sound-proof and vibration-proof member, and a surface layer member superposed on the floor panel is specifically taken into consideration. The present invention provides a linear lower rail which is directly secured to the floor panel through a cutout portion of the sound-proof and vibration-proof member, the lower rail being embedded in the sound-proof and vibration-proof member and the surface layer member.

The seat sliding device for a vehicle front seat provided according to the present invention is preferably applicable to a vehicle floor surface construction having the following features. Specifically, a floor panel on the floor surface should be provided with a foot rest portion on which a driver's foot can be seated, and a raised portion rising at the rearward position of the foot rest portion for securing the rail. The forward end of the linear lower rail may be secured to the rail fixing raised portion, thereby enabling the upper rail to move over the foot rest portion. Accordingly, the height of the rail fixing raised portion should be determined so that the upper rail can be moved over the foot rest portion. The floor panel is preferably provided with an inclined flat surface inclined rearwardly and downwardly from the rail fixing raised portion so that the linear lower rail can be fixed to the inclined surface with the lower surface thereof in abutment with the upper surface of the inclined surface. As explained above, a seat sliding device for a front seat of a vehicle according to the present invention comprises a linear lower rail secured directly to a floor panel of a vehicle floor surface including a sound-proof and vibration-proof member and a surface layer member superposed on the floor panel, the lower rail being embedded in the sound-proof and vibration-proof member and the surface layer member. Thus, exposure of the lower rail can be prevented and hence excellent appearance of the vehicle floor panel obtained, as well as clear and extensive space below the seat and luxuriousness of the floor panel provided.

According to one embodiment of the invention, the upper rail includes a seat fixing vertical wall and the lower rail includes a lock plate extending substantially in parallel with the seat fixing vertical wall and protruding upwardly from the vehicle floor surface, the lock plate being formed with a series of lock apertures spaced apart along the direction of seat displacement, the seat fixing vertical wall being formed with a lock member for engagement with and disengagement from the series of lock apertures. Thus, the upper rail can be firmly locked to and released from the lower rail embedded in the vehicle floor surface.

According to another embodiment of the invention, the lower rail includes a box-like member of a uniform cross-section having a gap at the upper central portion thereof and the upper rail includes a seat fixing vertical wall extending upwardly from the gap. The lower rail and a portion of the surface layer member of the vehicle floor surface are covered with a pair of lower rail covers which can be split with respect to a line along the longitudinal axis of the seat fixing vertical wall. Thus, the lower rail and a portion of the surface layer member of the vehicle floor surface can easily be covered without affecting displaceable movement of the upper rail, while also increasing luxuriousness of the floor panel.

According to another embodiment of the invention, at least one of the longitudinal ends of the lower rail is mounted with an end cover having an elongated aperture in communication with the gap of the lower rail and adapted to permit slidable movement of the upper rail therein. Thus, the longitudinal ends of the lower rail can be easily covered without affecting slidable movement of the upper rail, while also providing superior appearance of the vehicle floor surface.

According to a further embodiment of the invention, the seat fixing vertical wall is so configured to be covered with a pair of upper rail covers so that the seat fixing vertical wall can be easily covered, while greatly increasing appearance of the seat sliding device.

According to still another embodiment of the invention, a scraper member for scraping out dust in the lower rail is provided at the upper rail, and a rearward end cover mounted on the rearward end of the lower rail and having a dust container is also provided. Thus, it is possible to scrape dust out of the lower rail upon rearward movement of the seat for collection of such dust in the dust container, without any specific operation.

BRIEF DESCRIPTION OF THE DRAWINGS

Embodiments of a seat sliding device for a front seat of a vehicle according to the present invention are shown in the drawings, wherein;

FIG. 12A is a plan view of FIG. 11A;

FIG. 12B is a plan view of FIG. 11B;

FIG. 13A is a side view of FIG. 11A;

FIG. 13B is a side view of FIG. 11B;

DETAILED DESCRIPTION

Figure 1:
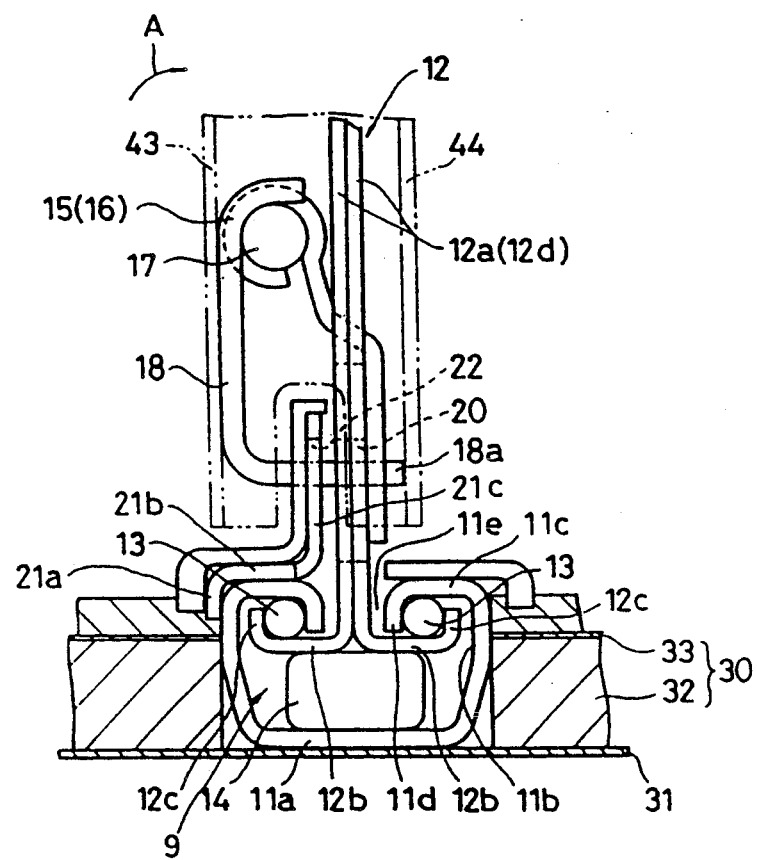
FIG. 1 is a sectional view along line I—I of FIG. 5, illustrating a first embodiment of the invention.
Figure 3:
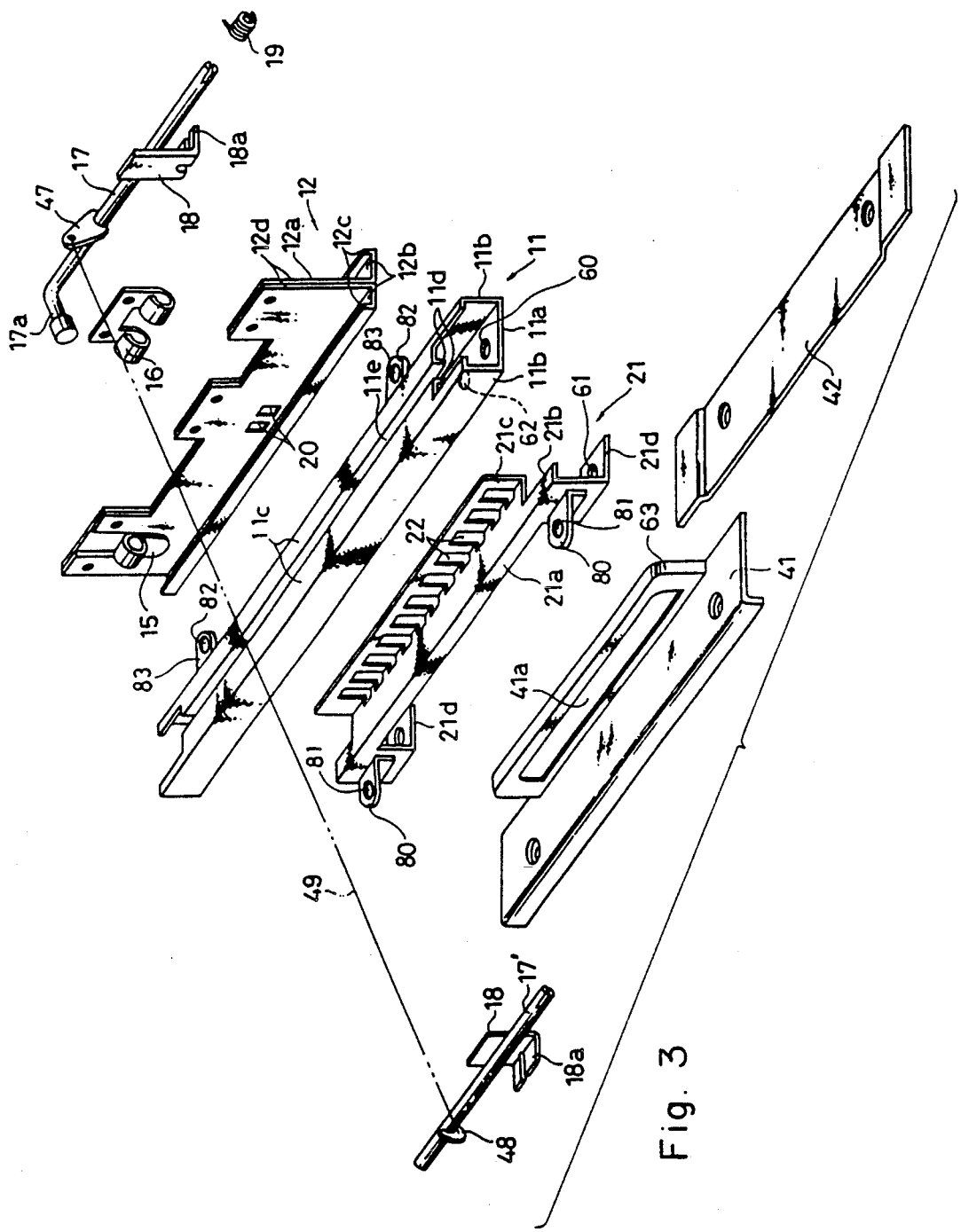
FIG. 3 is an exploded view illustrating a lower rail, upper rail and other related components of the first embodiment of the invention.

As shown in FIGS. 1 and 3, a lower rail 11 is formed by a longitudinal, symmetrical member having a uniform cross-section. The lower rail 11 includes a lower wall 11a, left and right vertical walls 11b, left and right upper walls 11c and left and right hanging walls 11d. The left and right hanging walls define a gap 11e therebetween. The lower wall 11a, left and right vertical walls 11b, left and right upper walls 11c and left, and right hanging wall 11d cooperate to define an inner space 9 for receiving therein a lower wall 12b of an upper rail 12, rolling balls 13, and a rolling roller 14. The rolling roller 14 is inserted between the lower wall 12b and the lower wall 11a.

Figure 5:
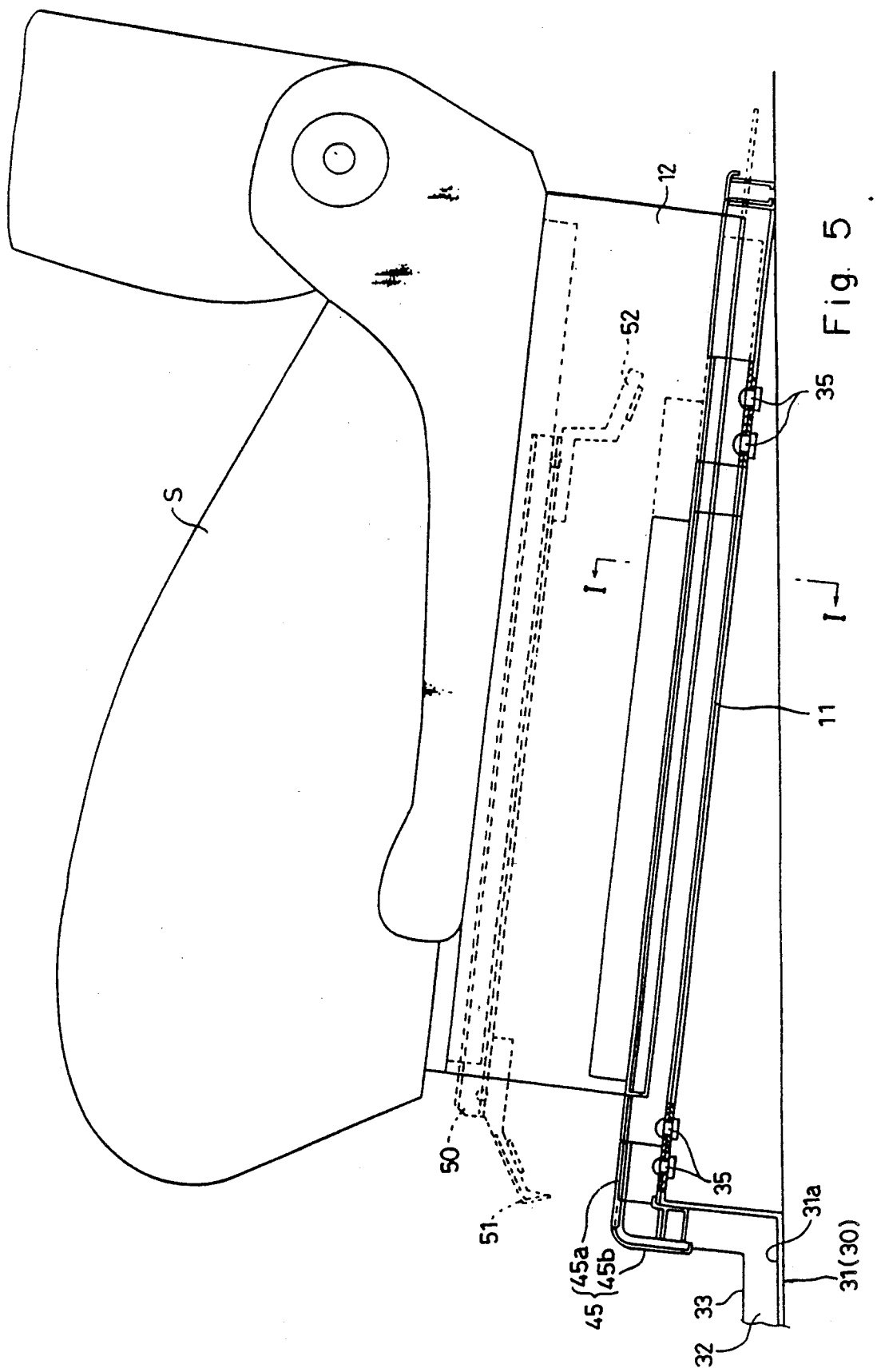
FIG. 5 is a side view of the vehicle floor surface and the seat sliding device attached to the vehicle floor surface.

The upper rail 12 is fitted into the lower rail for slidable movement so as to constitute a seat track. The upper rail 12 includes a pair of members 12a having an L-shaped cross section which are joined together in back-to-back relation. The L-shaped members are arranged so that the lower walls 12b thereof are positioned opposite to the left and right upper walls 11c, respectively, and so that the left and right vertical walls 12c extending upwardly from the respective ends of the lower wall 12b are positioned opposite to the left and right hanging walls 11d, respectively, so as to receive the balls 13 therein. The vertical walls 12d for securing a seat to the upper rail 12 protrude upwardly from the gap 11e of the lower rail 11. The length by which the vertical walls 12d protrude from the gap 11e is determined according to the height of the seat to be secured to the vertical walls 12d, and hence the length is very large compared to prior art upper rails. In this regard, the dotted lines of FIG. 5 illustrate a position of a seat track 50 and mounting brackets (51, 52) disposed rearward; and forwardly of the seat track respectively, according to a prior art design.

Figure 14:
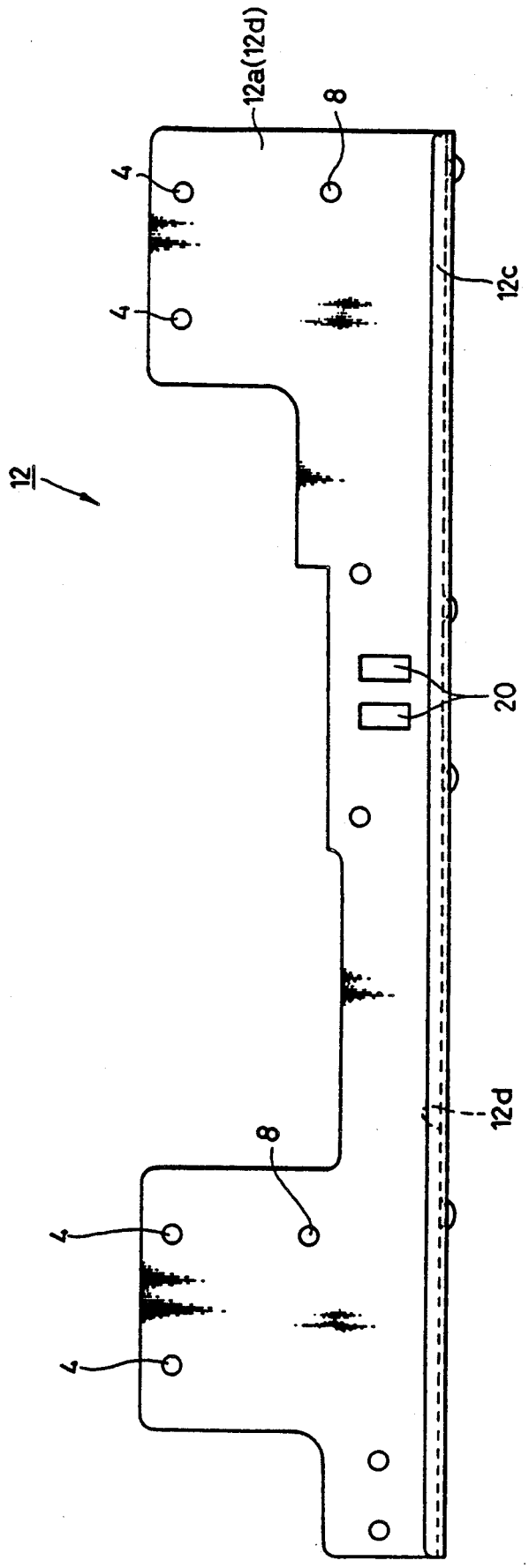
FIG. 14 is a front view illustrating the upper rail in detail.
Figure 15:
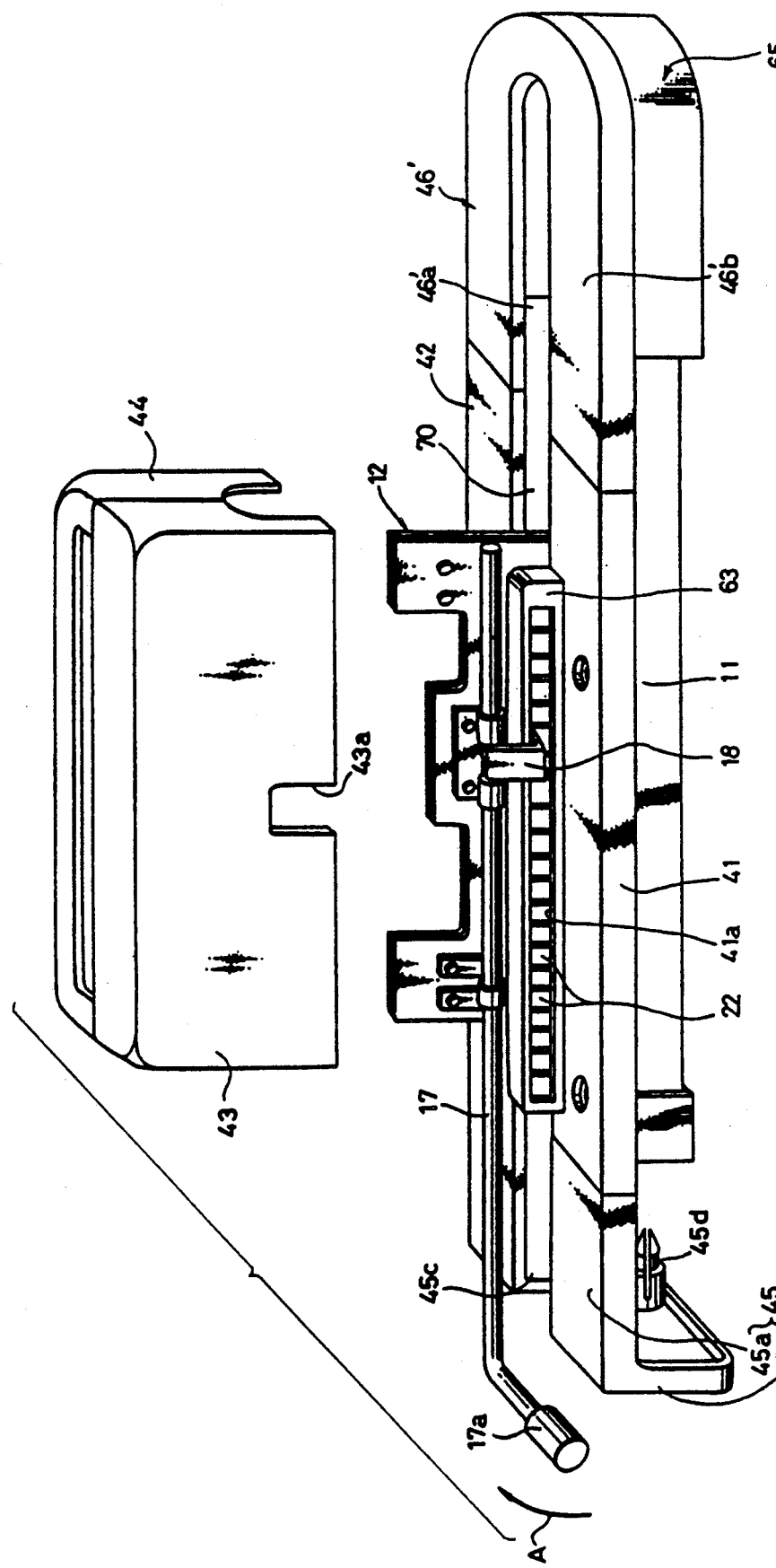
FIG. 15 is a perspective view showing the main portion of a seat sliding device having a dust container on a rear cover according to a second embodiment of the invention.
Figure 16:
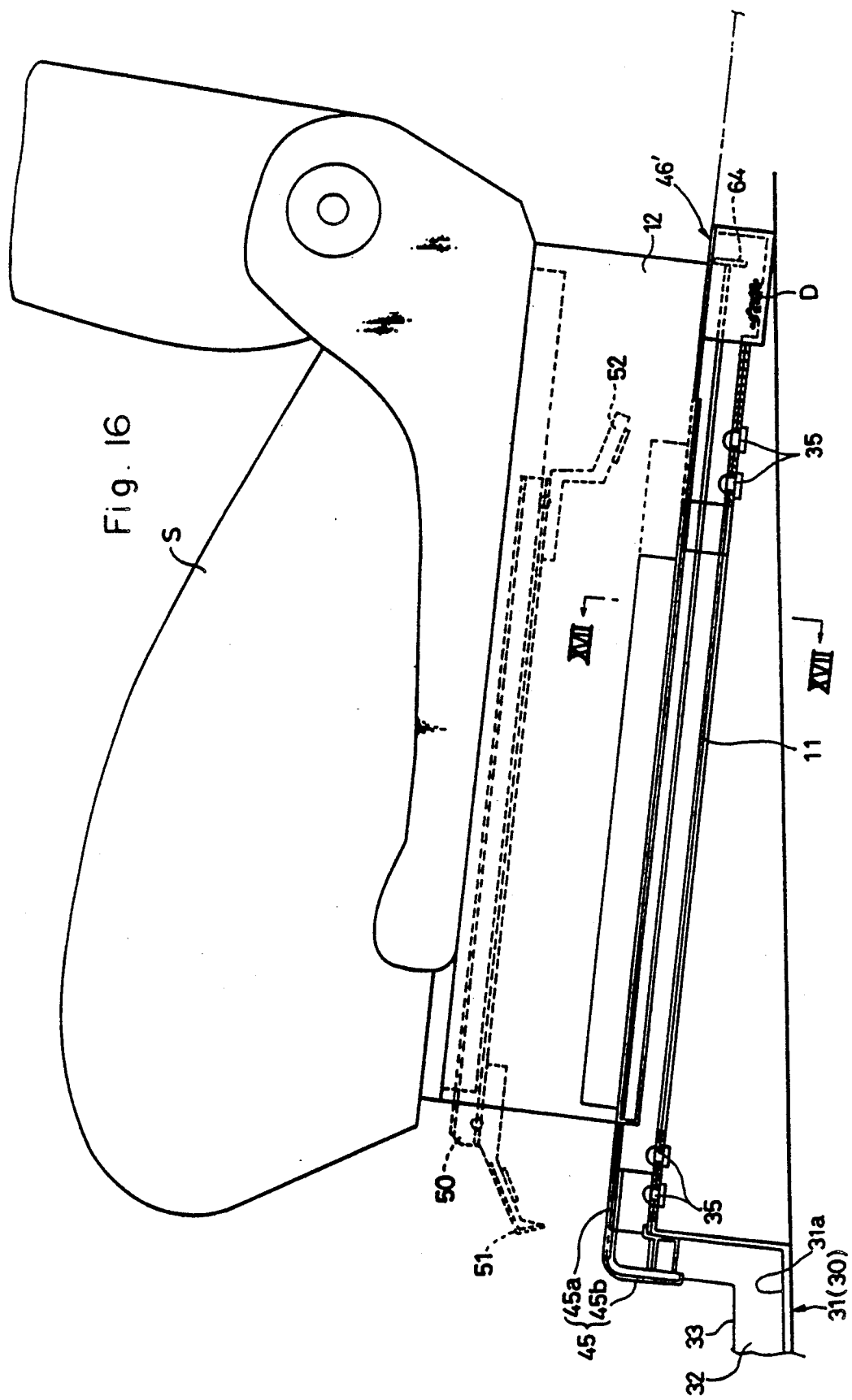
FIG. 16 a side view illustrating the floor surface and the seat slide device attached to the floor surface according to the second embodiment of the invention.
Figure 17:
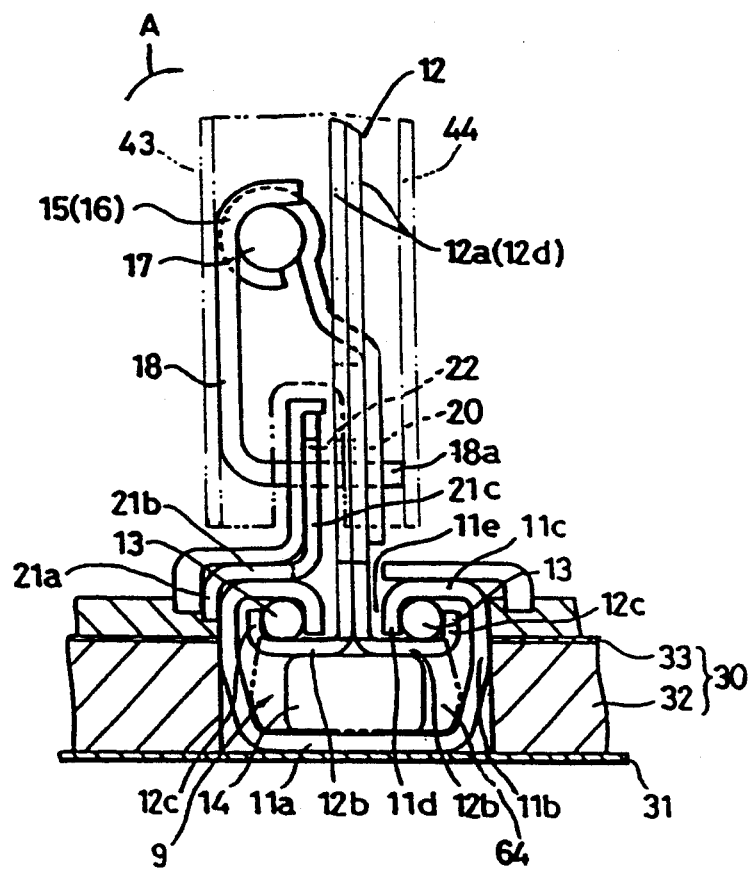
FIG. 17 is a cross-sectional view along line VIII—VIII in FIG. 16.
Figure 18:
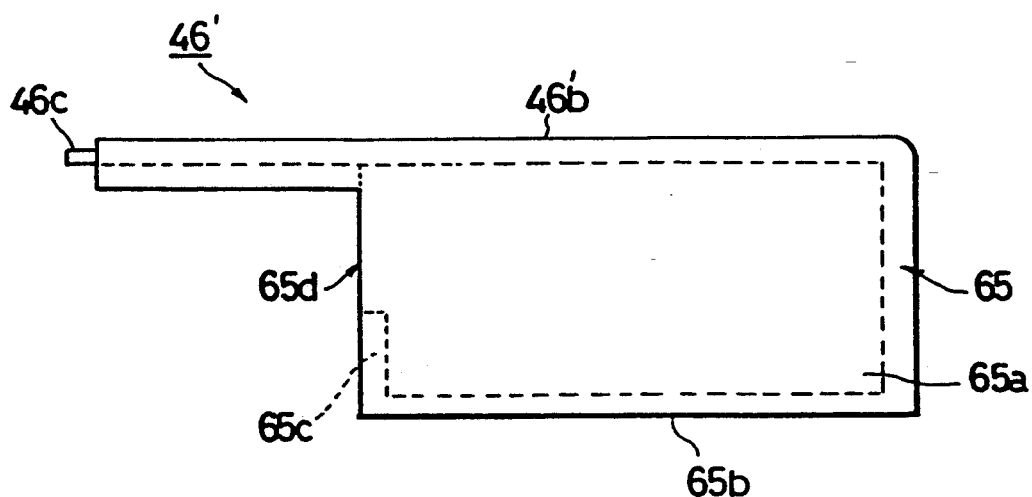
FIG. 18 is a side view illustrating a rearward end cover in detail.
Figure 19:
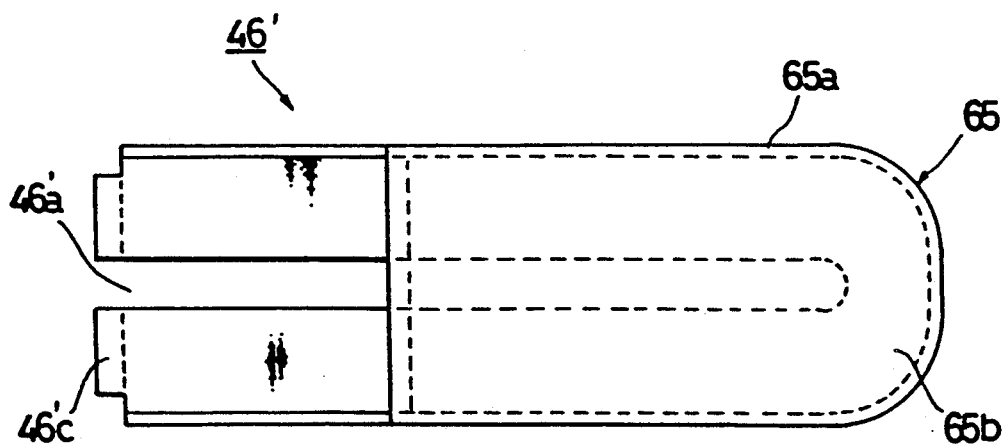
FIG. 19 is a bottom view illustrating the rearward end cover in detail.

A lock shaft 17 is rotatably supported by the vertical walls 12d of the upper rail 12 through mounting brackets 15 and 16, with the lock shaft 17 extending in a forward and rearward direction. A lock lever or lock member 18 is fixed to the lock shaft 17. Lock-reinforcement apertures 20 are formed in the vertical walls 12d of the upper rail 12. The lock-reinforcement apertures 20 are adapted to be engaged and disengaged by a tip of each of lock pawls 18a of the lock lever 18. The lock shaft 17 is urged by a torsion coil spring 19 in a rotational direction so that the lock pawls 18a are fitted into the respective lock-reinforcement apertures 20. As shown in FIG. 14, the vertical walls 12d are recessed at the portion above the lock-reinforcement apertures or lock apertures. Protruded portions on both sides of the recess of the vertical walls 12d are formed with bolt holes 4 for securing the seat S. Additionally, a through-hole 8 for securing a cover is formed in each of the protruded portions at a position below the bolt hole 4 (FIG. 14).

The lower rail 11 has rivet holes 60 at the forward and rearward ends thereof and rivet holes 62 adjacent to the respective rivet holes 60 and located at a position corresponding to respective rivet holes 61 formed in fixing walls 21d. The lower rail 11 is secured to the floor surface, together with a lock plate 21 integrally mounted thereon. Assembly is carried out according to the following procedure. First, the lock plate 21 is positioned so that the fixing walls 21d are located below the lower surface of the lower wall 11a of the lower rail 11. Then, the rivet holes 62 at the forward and rearward ends of the lower wall 11a and the rivet holes 61 in the fixing walls 21d are aligned in order to weld the lower rail and the lock plate together. Thereafter, rivets 35 (FIG. 5) are inserted into rivet holes 60 and rivet holes 62 (61) so as to secure them to the floor surface.

The lock plate 21 includes a vertical wall 21a and a transverse wall 21b both extending along the left and right vertical walls 11b and left and right upper walls 11c and a lock wall 21c extending upwardly from the transverse wall 21b in parallel relation with the vertical walls 12d for fixing the seat. The lock wall 21c is formed with a series of lock apertures 22 (row of lock apertures) extending longitudinally within lock wall 21c for permitting engagement/disengagement of the lock pawls 18a relative to the lock apertures. The vertical position of lock apertures 22 substantially corresponds to that of the lock reinforcement aperture 20 of the upper rail 12, while the pitch thereof corresponds to the distance between the forked lock pawls 18a.

Figure 2:
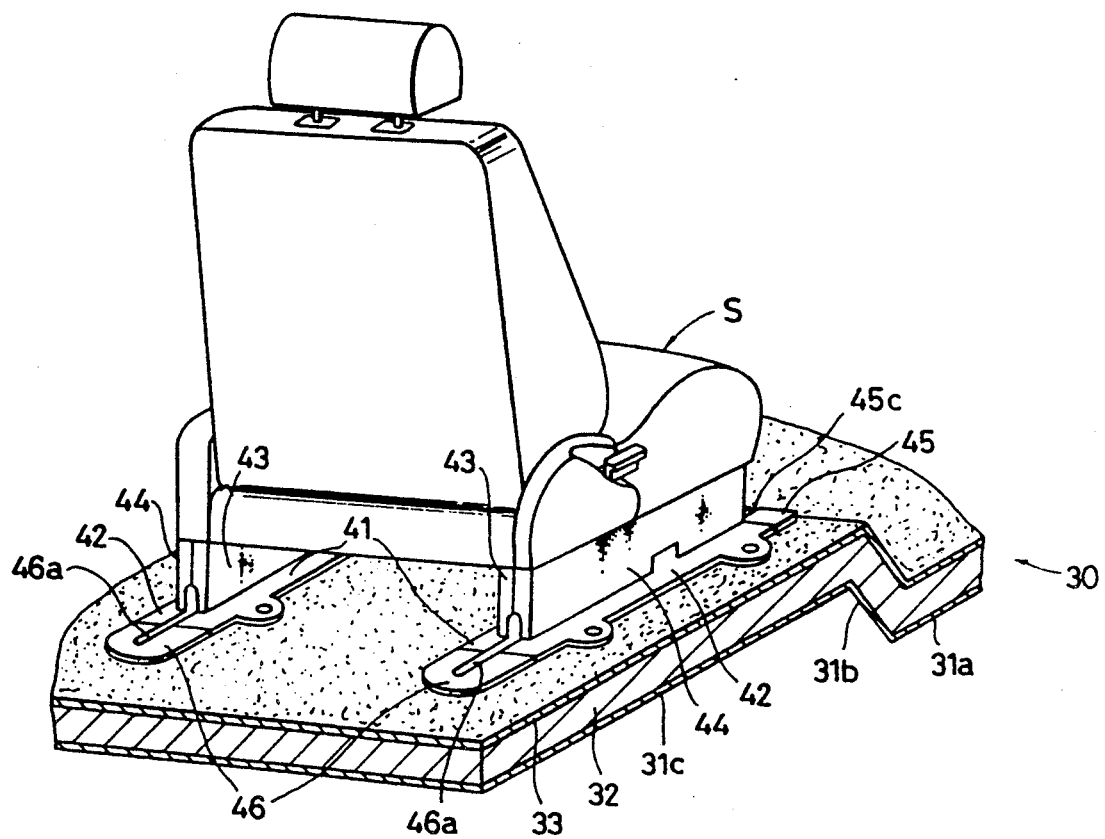
FIG. 2 is a perspective view of a seat sliding device according to the first embodiment of the invention.
Figure 6:
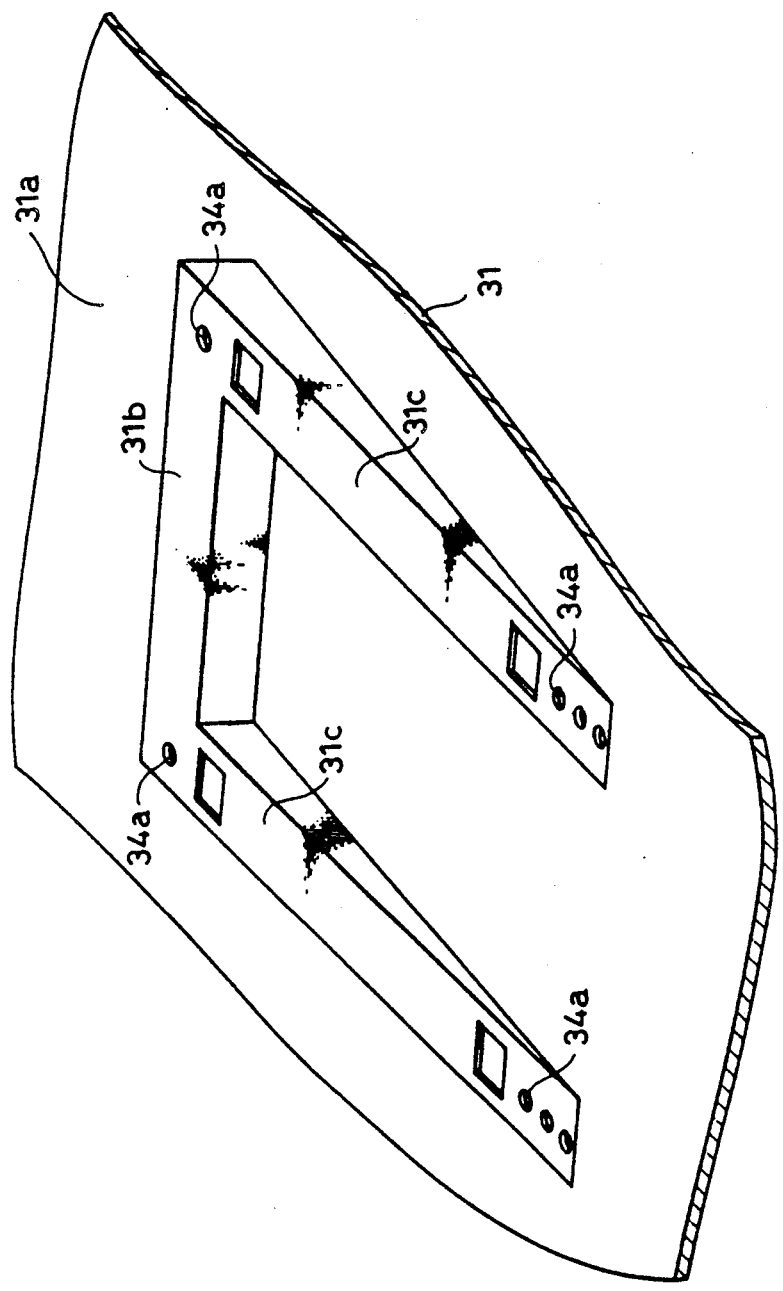
FIG. 6 is a perspective view showing a floor panel of the vehicle floor surface.
Figure 7A:
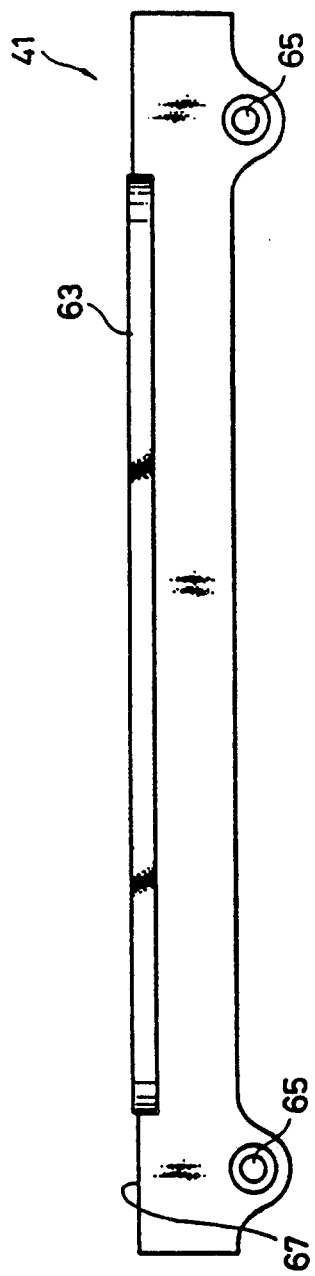
FIG. 7A is a plan view of a left flat cover.
Figure 7B:
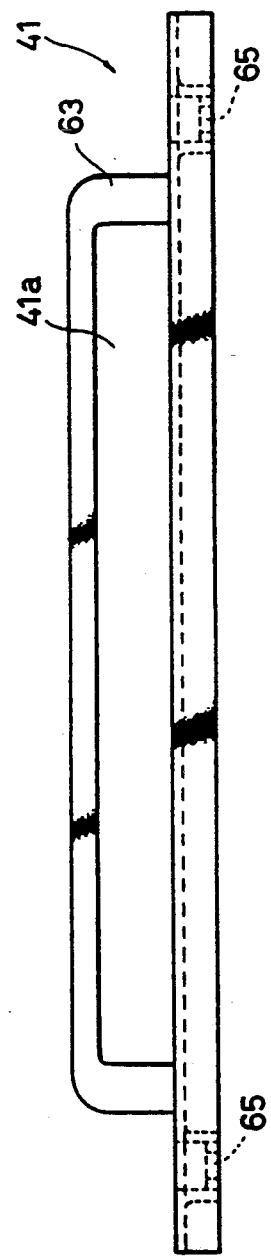
FIG. 7B is a side view of the left flat cover.

A vehicle floor surface 30 to which the seat track having the above construction is constituted is shown in FIGS. 2, 5 and 6. As is well known to one having ordinary skill in the art, the vehicle floor surface 30 has a multi-layer construction comprising a floor panel 31 of a steel sheet, a sound-proof and vibration-proof member, such as an asphalt layer 32 on the floor panel 31, and a carpet layer 33, i.e., surface layer material, on the asphalt layer 32. The vehicle floor surface 30 according to the present invention includes, as shown in FIG. 6, a foot rest portion 31a, a raised portion 31b for securing of the rail, and inclined flat surfaces 31c, each provided on the floor panel 31.

The foot rest portion 31a is a portion on which a driver's foot rests while he is sitting on the seat and comprises a flat surface. The raised portion 31b for securing of the rail has a substantially squared C-shaped cross-section and extends in upward and transverse directions. The raised portion 31b serves to provide an inclination necessary for the lower rail 11 (seat S) as well as permitting the upper rail 12 to protrude forwardly of the lower rail 11. The inclined flat surface 31c is a flat surface which inclines downwardly from the rail fixing raised portion 31b toward the rearward portion of the vehicle and serves to fully support the lower surface of the lower wall 11a of lower rail 11. The rail fixing raised portion 31b and inclined flat surfaces 31c represent, in a plan view, a substantially inverted squared U-shaped configuration and are provided with suitable means for fixing the lower rail 11 thereto, such as through holes 34a and rivets 35. The inclined flat surface 31c can be eliminated if the lower rail 11 is provided with suitable support means.

The asphalt layer 32 and carpet layer 33 on the vehicle floor surface are removed at a portion to which the rail fixing raised portion 31b and the inclined flat surfaces 31c are to be fixed, as shown in FIG. 1. The lower rail 11 and the lock plate 21 are inserted into the portion where a Portion of the asphalt layer and carpet layer has been removed and are fixed to the vehicle floor surface 30 by means of rivets 35, with the forward end thereof engaging with the raised portion 31b and the rearward portion thereof engaging the inclined surfaces 31c. Consequently, the lower rail 11 is substantially embedded in the asphalt layer 32 and the carpet layer 33. In this embedded condition, the upper rail 12 is inserted into the lower rail, and seat S (FIGS. 2 and 5) is fixed onto the upper rail 12.

Figure 8A:
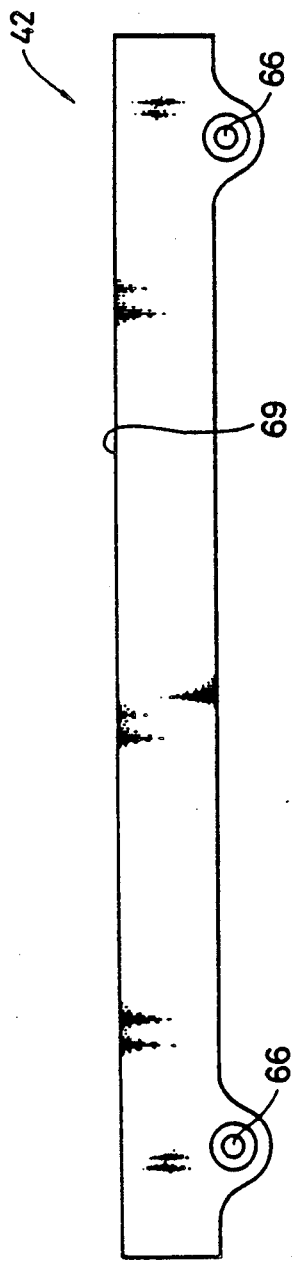
FIG. 8A is a plan view of a right flat cover.
Figure 8B:
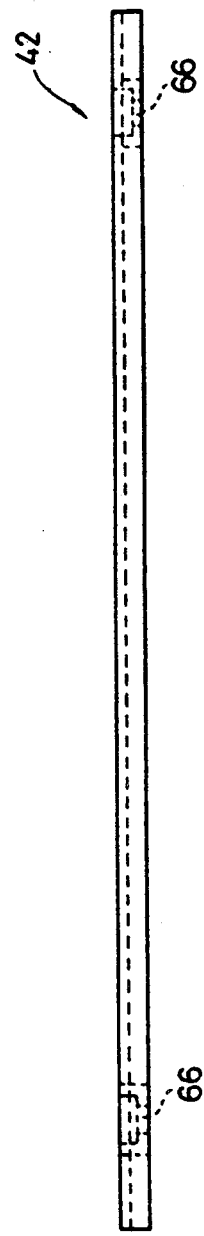
FIG. 8B is a side view of the right flat cover.

The portions of the lower rail 11 which protrude upwardly from surface of the carpet layer 33 are covered with left and right flat covers 41 and 42, i.e., lower rail covers, made of synthetic resin. Generally, the left flat cover 41 is integrally formed with a vertical wall 63 for covering the exposed surface of the lock plate 21 and includes an exposure window 41a designed to correspond with the lock apertures 22 of lock plate 21. The left flat cover 41 has at the longitudinally opposite ends thereof, bolt holes 65 which permit a bolt to be passed therethrough when it is intended to secure the cover 41 to lower rail 11, i.e., to brackets 80 provided at the lock plate 21 and having a bolt hole 81. As shown in FIGS. 8A and 8B, the right flat cover 42 is also configured to be an elongated member extending along the upper rail 12, like the left flat cover 41. The right flat cover 42 has at its longitudinally opposite ends bolt holes 66 which permit a bolt to be passed therethrough when it is intended to secure the cover 42 to the lower rail 11, i.e., to brackets 82 provided on the lock plate 21 and having a bolt hole 83. The left and right splittable flat covers 41 and 42 each include side surfaces (67, 69) defining a slide groove 70 (FIG. 4) which permits longitudinally slidable movement of the seat fixing vertical walls 12d when the covers 41 and 42 are mounted on the vehicle floor surface 30. Seat fixing vertical walls 12d protrude upwardly from the gap 11e of the lower rail 11 clamped therebetween from opposite directions.

Figure 4:
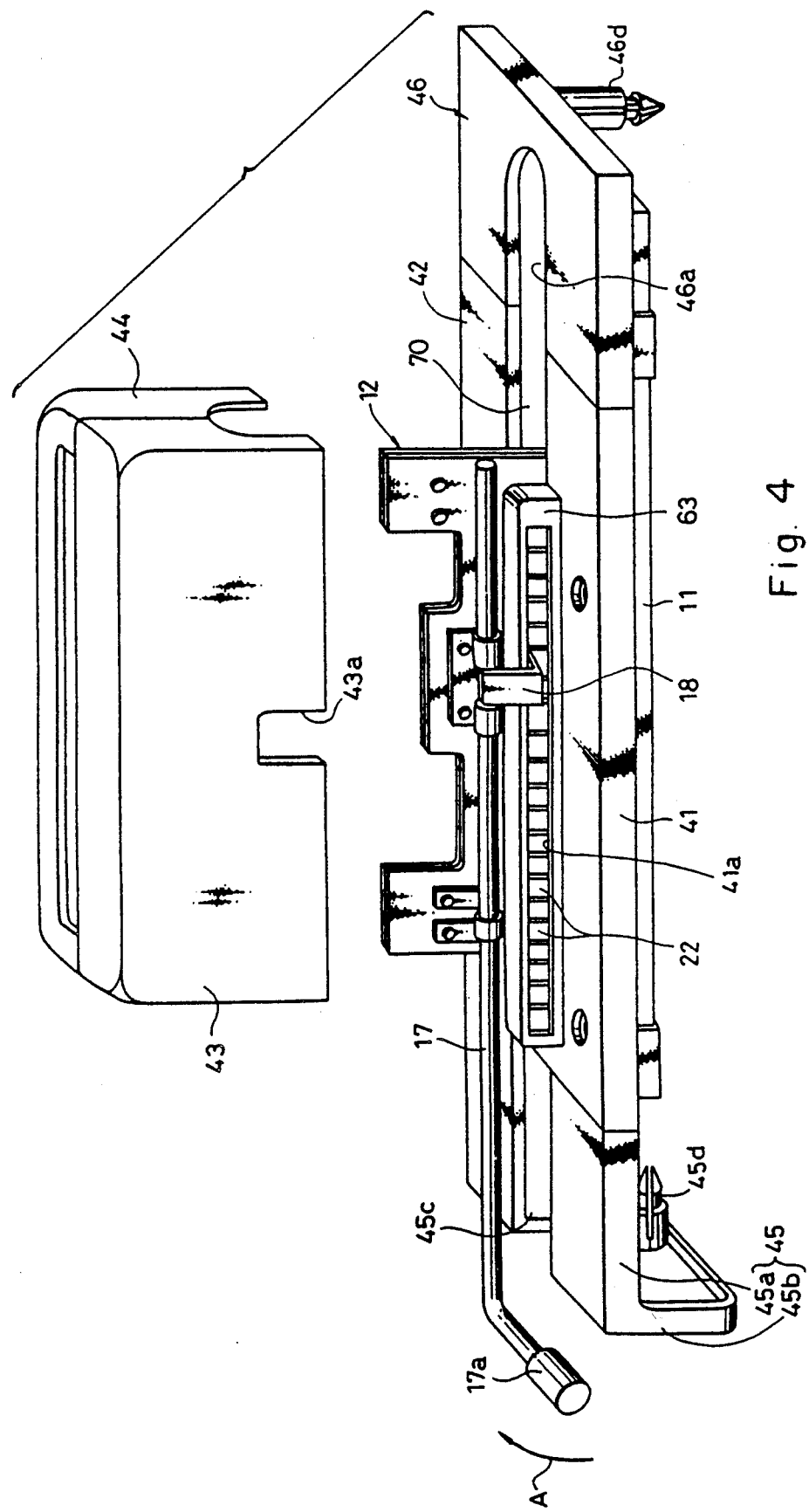
FIG. 4 is a perspective view illustrating the components shown in FIG. 3 in an assembled state.

As shown in FIG. 4, left and right longitudinal covers (upper rail covers) 43 and 44 made of synthetic resin material are fixed in a position at the opposite side of upper rail 12. The left and right longitudinal covers (43, 44) have a plate like configuration that is substantially symmetrical with respect to the longitudinal axis thereof. As shown in FIGS. 11A through 13B, the left cover 43 includes side walls 43c, 43d and 43e at the longitudinal opposite sides and upper side of the side surface 43b, respectively. A free groove 43a is formed in the side surface 43b at a position corresponding to the lock lever 18, the free groove 18 permitting movement of the lock lever 18. Female recesses 72 are formed in the inner surface of the side surface 43b facing toward the seat fixing vertical wall 12d at a position corresponding to the respective cover fixing holes 8. A female recess 73 is formed in the side surface 43 at a position above the free groove 43a. The side walls 43c and 43 are formed with respective notches 43f, and alignment protrusions 74 are formed such that they project from the respective notches toward the seat fixing vertical walls 12d.

The right longitudinal cover 44 includes side walls 44c, 44d and 44e at the longitudinal opposite ends of and upper side of the side surface 44b, respectively. A notch 44g is formed in the upper wall 44e at a position corresponding to the seat fixing vertical walls 12d. Notch 44g defines an opening 76 to permit the seat fixing vertical walls 12d to extend upwardly of the opening 76. Male protrusions 77 are formed on the inner surface of the side surface 44b, facing toward the seat fixing vertical walls 12d. The male protrusions correspond to the cover fixing holes 8 of seat fixing vertical walls 12d. A male protrusion 78 is also provided at a position corresponding to insert recess 73.

Insert fixing portions are formed by the male protrusions 77 and female recesses 72 and also by the male protrusion 78 and female recess 73. The tips 77a and 78a of each of the male protrusions 77 and 78 are configured to form an enlarged portion which imparts flexibility due to a notch 80 formed at the central portion thereof. The female recesses 72 and 73 each include a cylindrical member having a cavity therein and the inner diameter thereof is selected so as to enable it to be inserted into the cover fixing hole 8. The female recesses 72 and 73 include at the distal surface thereof insert holes 72a and 73a, respectively, which insert holes receive the respective tip portion 77a and 78a of the male protrusions 77 and 78 in a compressed state.

A front cover (forward end cover) 45 and a rear cover (rearward end cover) 46 are fixed to the vehicle floor surface 30 at positions forward and rearward of the lower rail 11, respectively. Both covers are made of synthetic resin material.

Figure 9A:
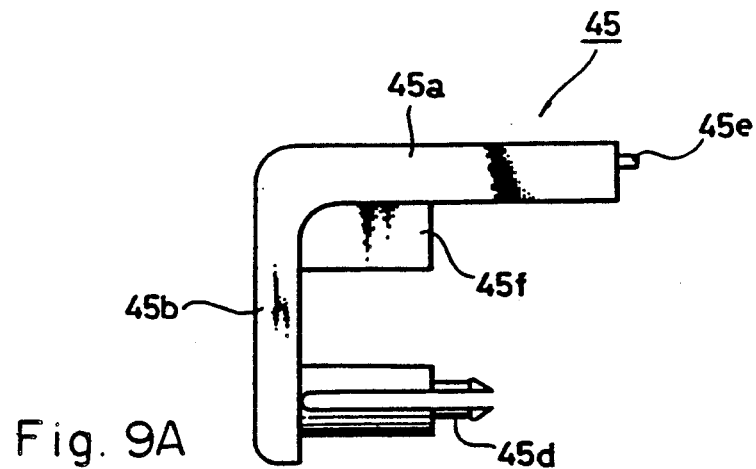
FIG. 9A is a side view of a front cover.
Figure 9B:
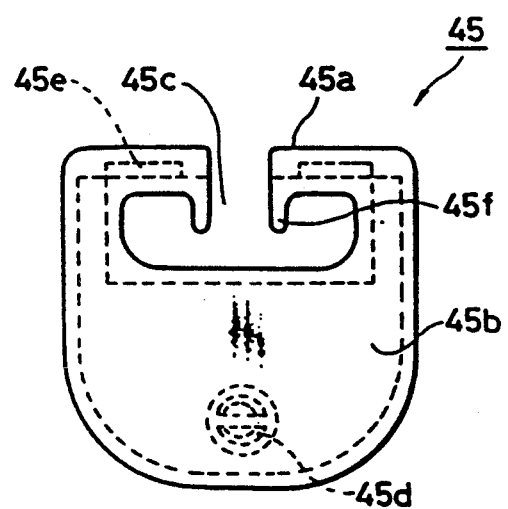
FIG. 9B is a front view of the front cover of FIG. 9A.

As shown in FIGS. 4, 9A, and 9B, the front cover 45 includes a flat portion 45a extending substantially in parallel with the lower rail 11, and a deflected portion 45b extending substantially in parallel with the rail fixing raised portion 31b. In the middle of the flat portion 45a and the deflected portion 45b, there is provided a groove 45c, i.e., an elongated aperture, for permitting the upper rail 12 to slidably displace itself toward the foot rest position 31a. A protuberance 45d is formed on the deflected portion 45b at the middle and lower portion thereof, the protuberance serving to fix the deflected portion 45b to the carpet layer 33 when it is inserted into the carpet layer in the desired position. The flat portion 45a has protuberances 45e at its respective ends, adjacent to the left and right flat covers 41 and 42, that secure the flat portion 45a to covers 41 and 42 when it is inserted into the covers. In FIGS. 9A and 9B, reference numeral 45f designates side walls which restrict positioning of the lower rail 11 in abutting relation with the forward end of the lower rail.

Figure 10A:
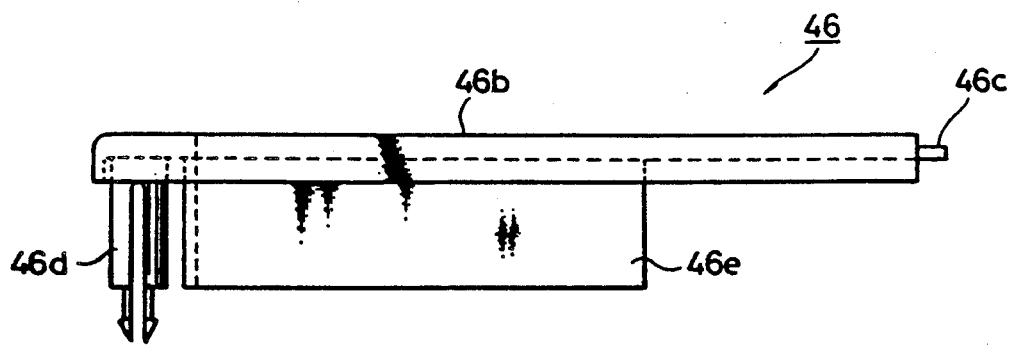
FIG. 10A is a side view of a rear cover.
Figure 10B:
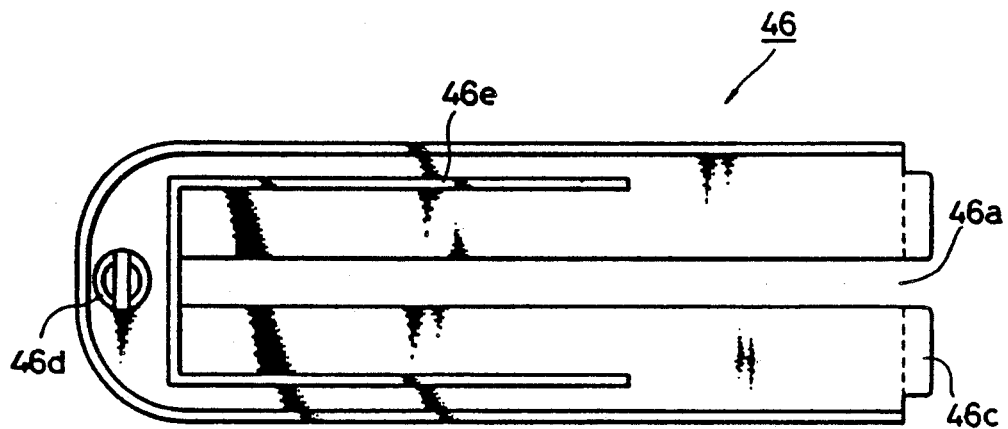
FIG. 10B is a bottom view of the rear cover of FIG. 10A.
Figure 11A:
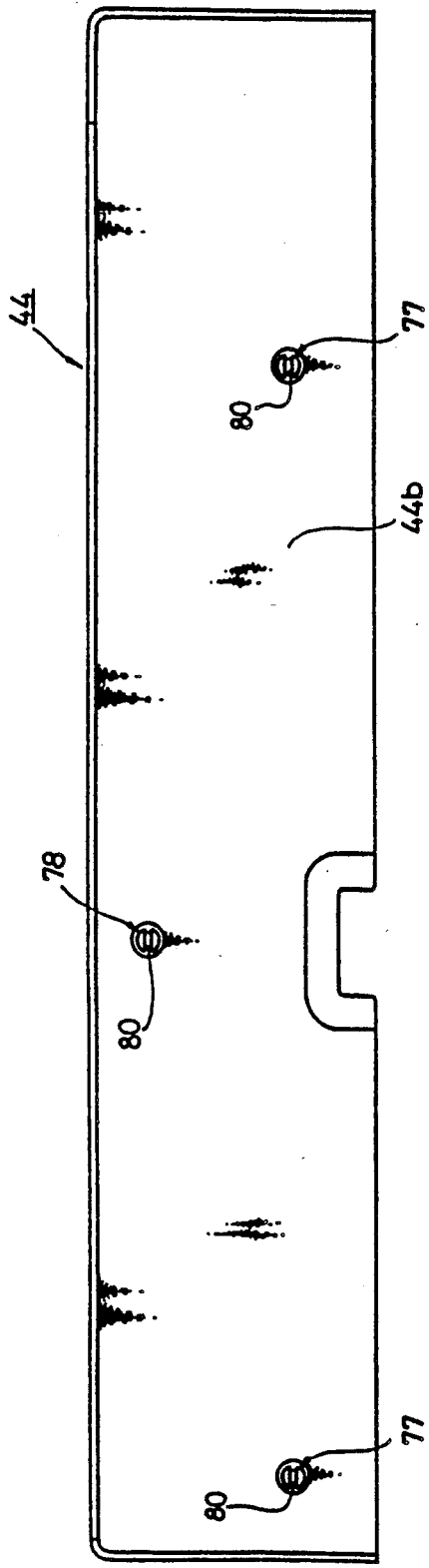
FIG. 11A is a front view of a right longitudinal cover.
Figure 11B:
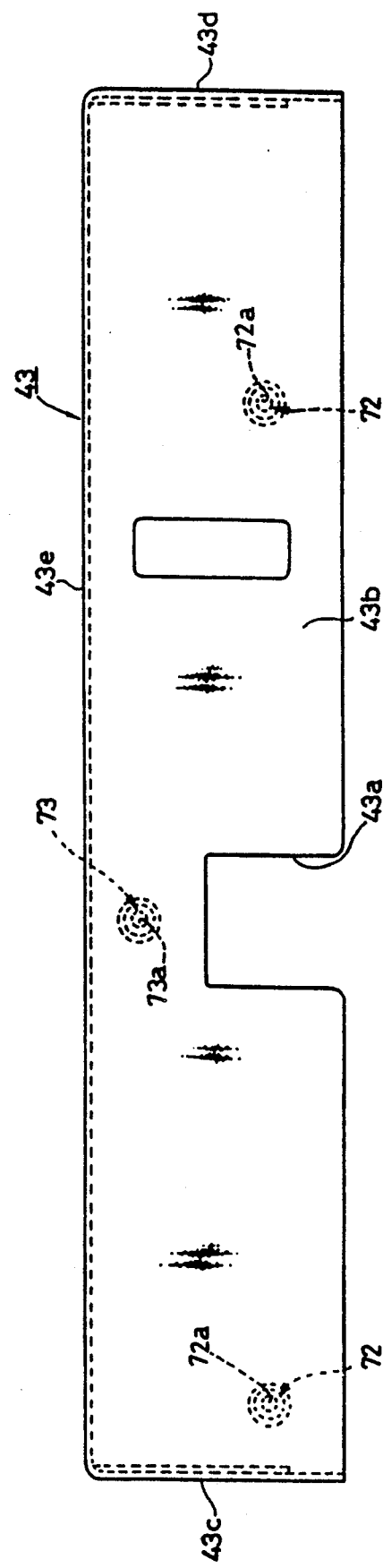
FIG. 11B is a front view of a left longitudinal cover.

The rearward end cover 46 includes a flat portion 46b extending substantially in parallel with the lower rail 11, as shown in FIGS. 4, 10A, and 10B. In the middle of the flat portion 46b, there is provided a groove or elongated aperture 46a for permitting rearward movement of the upper rail 12. The flat portion 46b includes protuberances 46c at its end adjacent to the left and right flat covers 41 and 42 adapted to be inserted into the respective covers 41 and 42 for securing of the flat portion 46b to the covers. At the back side and rearward portion of the flat portion 46b, there is provided a protuberance 46d for fixing the rearward portion of the rear cover 46 when it is inserted into a suitable portion of the carpet layer 33 and asphalt layer 32 on the inclined flat portion 31c. In FIGS. 10A and 10B, reference numeral 46e designates side walls for positioning the rear cover 46 in a position parallel with the notches of the carpet layer 33 and the asphalt layer 32. The above covers 41 to 46, made of synthetic resin, serve to prevent exposure of the lower rail 11, as well as exposure of the upper rail 12, thereby contributing to a superior appearance of the vehicle floor surface.

The lock mechanism of the seat sliding device having the above construction can be released in a manner similar to that in the prior art. Namely, rotation of the lock shaft 17 in the direction of arrow A in FIGS. 1 and 4 by means of a release handle 17a also causes rotation of the lock lever 18 integral therewith in the same direction, whereby lock pawls 18a of the lock lever 18 become disengaged from the lock reinforcement apertures 20 and lock apertures 22. Thus, the longitudinal position of the seat may be adjusted by sliding the upper rail 12 relative to lower rail 11. This sliding movement of upper rail 12 can be carried out smoothly since the lower walls 12b of the upper rail are supported by the rolling roller 14 and the rolling balls 13 at the upper side and lower side thereof. Accordingly, the seat S is able to slide very smoothly in both forward and rearward directions.

When the user releases the release handle 17a after completion of the positioning of the seat, the lock shaft 17 and the lock lever 18 are rotated in a direction opposite to that shown by the arrow A due to the action of the torsion coil spring 19. By this mechanism, the lock pawls 18a will transversely fit into either of the lock apertures 22 and lock reinforcement apertures 20, thus firmly locking the position of the seat.

In the event of a double lock mechanism in which a lock mechanism is provided at both seat tracks, an interlocking arm 47 is connected to the lock shaft 17 as shown in FIG. 3. The interlocking arm 47 is then connected via a length of wire 49 to an interlocking arm 48 secured to a lock shaft 17' without having a release handle 17a of the other lock mechanism, the construction of which is substantially the same as that of the lock mechanism 17.

In the illustrated embodiment, the vertical walls 12d for securing the seat and the portion functioning as an upper rail are integrally formed so as to constitute the upper rail 12. However, the portion functioning as an upper rail and a portion corresponding to the seat securing vertical walls 12d may be formed separately. In this case, the above portions will be made unitary during assembly so that they function as the upper rail of the above embodiment.

Now a second embodiment of the present invention will be described below with reference to FIGS. 15 to 19. In this embodiment, the rearward end cover 46 of the first embodiment is modified to form a rearward end cover 46' which not only covers the rearward portion of the seat track device but also is capable of containing dust from the lower rail 11.

The rearward end cover 46', like the above-described rearward end cover 46, includes a groove 46a' for permitting movement of the upper rail therethrough, a flat portion 46b', and protuberances 46c' for securing the flat portion. A dust container 65 having a box-like configuration is located below the flat portion 46b' and is formed integrally with the flat portion 46b'. The dust container 65 includes an outer peripheral wall 65a, a bottom wall 65b and a front wall 65c. An opening 65d is provided at the front portion of the container 65, the opening being surrounded by the flat portion 46b', outer peripheral wall 65a and front wall 65c. The upper rail 12 is configured such that, upon displacement thereof in the forward and rearward directions, the forward end and rearward end thereof protrude from the front end and rear end of the lower rail 11, respectively. A scraper member 64 for scraping dust D in the lower rail 11 out of the rail is secured to the lower wall 12b at the rearward portion thereof. The scraper member 64 is formed from resilient material such as synthetic resin and is configured to have a thin wall. The scraper member 64 has a contour substantially corresponding to the shape defined by the lower wall 11a and the left and right vertical walls 11b of the lower rail 11.

With the above construction, the dust D in the lower rail is scraped out of the rail by means of the scraper member 64 which, during rearward movement of the upper rail 12 upon position adjustment of the seat S, moves rearwardly together with the upper rail 12. When the scraper member 64 moves into the dust container 65 through the opening 65d, the dust D is collected in the dust container 65. It is possible to discard the dust collected in the dust container 65 through the opening 65d by removing the rearward end cover 46' from the rearward end portion of the lower rail 11 and lightly shaking the cover 46'.

In the second embodiment, flat portion 46'b and dust container 65 are integrally formed so as to constitute the rearward end cover 46'. The flat portion 46'b and the dust container 65, however, can be formed separately. Specifically, the dust container 65 can be designed so that it is detachably mounted on the flat portion 46'b by means of a suitable snap fit engagement mechanism. With this construction, the dust container 65 may be removed from the flat portion 46' so as to facilitate discard of the dust D.

We claim:

1. A seat-sliding device for a front seat of an automobile comprising:
   a vehicle floor surface comprising a floor panel, a soundproof and vibration-proof member mounted on said floor panel, and a surface layer member formed over said soundproof and vibration-proof member;
   a cutout opening formed by removing a predetermined portion of said soundproof and vibration-proof member and said surface layer member so as to expose a linear portion of said floor panel;
   a linear lower rail inserted into said cutout opening and secured to said exposed linear portion of said floor panel; and
   an upper rail slidably inserted into said lower rail and secured to the seat;
   wherein said lower rail secured to said floor panel is comprised of a uniform cross-sectional member having a gap at a central upper portion thereof, wherein said upper rail includes a vertical wall extending upwardly from said gap and adapted to fix the seat at the upper end thereof, and wherein an end cover is mounted to at least one of the longitudinal ends of said lower rail.

2. The seat-sliding device for a front seat of an automobile according to claim 1, wherein said lower rail is disposed at the left or right side of the vehicle floor surface.

3. The seat-sliding device for a front seat of an automobile according to claim 1, wherein said soundproof and vibration-proof member is an asphalt layer.

4. The seat-sliding device for a front seat of an automobile according to claim 1, wherein said surface layer member is a piece of carpet.

5. A seat-sliding device for a front seat of an automobile comprising:
   a vehicle floor surface comprising a floor panel, a soundproof and vibration-proof member mounted on said floor panel, and a surface layer member formed over said soundproof and vibration-proof member;
   a cutout opening formed by removing a predetermined portion of said soundproof and vibration-proof member and said surface layer member so as to expose a linear portion of said floor panel;
   a linear lower rail inserted into said cutout opening and secured to said exposed linear portion of said floor panel; and
   an upper rail slidably inserted into said lower rail and secured to the seat;
   wherein said floor panel includes a foot rest portion for placement of a driver's foot, and a raised portion for securing the rails, said raised portion being raised at the rearward end of said foot rest portion, and wherein said linear lower rail is secured to said raised portion at the forward end thereof so that said upper rail is slidably movable over said foot rest portion.

6. The seat-sliding device for a front seat of an automobile according to claim 5, wherein said floor panel includes an inclined flat surface inclined rearwardly and downwardly from said raised portion and wherein said linear lower rail is secured to said inclined flat surface.

7. A seat-sliding device for a front seat of an automobile comprising:
   a vehicle floor surface comprising a floor panel, a soundproof and vibration-proof member mounted on said floor panel, and a surface layer member formed over said soundproof and vibration-proof member;
   a cutout opening formed by removing a predetermined portion of said soundproof and vibration-proof member and said surface layer member so as to expose a linear portion of said floor panel;
   a linear lower rail inserted into said cutout opening and secured to said exposed linear portion of said floor panel; and
   an upper rail slidably inserted into said lower rail and secured to the seat;
   wherein said upper rail includes a seat fixing vertical wall for securing the seat at the upper end thereof, wherein said lower rail includes a lock plate extending substantially in parallel with said vertical wall and extending upwardly of said vehicle floor surface, said lock plate being formed with a series of lock apertures spaced apart from one another along the direction of seat displacement, and wherein said vertical wall supports a lock member for engagement with and disengagement from one of said lock apertures.

8. The seat-sliding device for a front seat of an automobile according to claim 7, wherein said upper rail supports a lock shaft extending along the longitudinal axis thereof for pivotal movement, said lock member being mounted on said lock shaft.

9. The seat-sliding device for a front seat of an automobile according to claim 7, wherein said vertical wall for securing the seat is provided with a lock hole to which said lock member engages and disengages.

10. The seat-sliding device for a front seat of an automobile according to claim 7, wherein said lower rail and said upper rail are disposed at the left and right sides of said vehicle floor surface, wherein each of said left and right lower rails includes said lock member defined as left and right lock members, respectively, and wherein said left and right lock members are connected by connection means for common movement therebetween.

11. The seat-sliding device for a front seat of an automobile according to claim 10, wherein said connection means comprise a wire extending between said left and right upper rails.

12. A seat-sliding device for a front seat of an automobile comprising:
   a vehicle floor surface comprising a floor panel, a soundproof and vibration-proof member mounted on said floor panel, and a surface layer member formed over said soundproof and vibration-proof member;
   a cutout opening formed by removing a predetermined portion of said soundproof and vibration-proof member and said surface layer member so as to expose a linear portion of said floor panel;
   a linear lower rail inserted into said cutout opening and secured to said exposed linear portion of said floor panel; and
   an upper rail slidably inserted into said lower rail and secured to the seat;
   wherein said lower rail comprises a uniform cross-sectional member including a gap at a central upper portion thereof, wherein said upper rail extends upwardly from said gap and includes a vertical wall for securing said seat at an upper end portion thereof, and wherein an upper portion of said lower rail and a portion of said surface layer member of said vehicle floor surface are covered with a pair of lower rail covers splittable along the longitudinal axis of said vertical wall for securing said seat.

13. The seat-sliding device for a front seat of an automobile according to claim 12, wherein said lower rail is provided with a lock plate having a series of lock apertures spaced apart from one another in a direction of seat displacement, said lock plate being integral with said lower rail and extending substantially in parallel with the longitudinal axis of said vertical wall for securing said seat to said upper rail, wherein said vertical wall for securing said seat supports thereon a lock member for engagement with and displacement from said lock apertures, and wherein at least one of said lower rail covers includes integrally therewith an exposure window for viewing of said series of lock apertures and a vertical wall for covering an exposed surface of said lock plate.

14. The seat-sliding device for a front seat of an automobile according to claim 12, wherein said pair of lower rail covers are made from a synthetic resin material.

15. The seat-sliding device for a front seat of an automobile according to claim 12, wherein said lower rail is provided with a bracket having a bolt hole, wherein each pair of said lower rail covers includes a bolt insert hole at a position corresponding to said bolt hole of said lower rail, and wherein one of said lower rail covers is fixed to said lower rail by means of a bolt inserted in and through said bolt insert hole and screwed into said bolt hole.

16. The seat-sliding device for a front seat of an automobile according to claim 12, wherein said upper rail is comprised of a pair of members of L-shaped configuration, said pair of members being attached with each other in back to back relationship.

17. A seat-sliding device for a front seat of an automobile comprising:
a vehicle floor surface comprising a floor panel, a soundproof and vibration-proof member mounted on said floor panel, and a surface layer member formed over said soundproof and vibration-proof member;
a cutout opening formed by removing a predetermined portion of said soundproof and vibration-proof member and said surface layer member so as to expose a linear portion of said floor panel;
a linear lower rail inserted into said cutout opening and secured to said exposed linear portion of said floor panel; and
an upper rail slidably inserted into said lower rail and secured to the seat;
wherein said lower rail secured to said floor panel is comprised of a uniform cross-sectional member having a gap at a central upper portion thereof, wherein said upper rail includes a vertical wall extending upwardly from said gap and adapted to fix the seat at the upper end thereof, and wherein an end cover is mounted to at least one of the longitudinal ends of said lower rail.

18. The seat-sliding device for a front seat of an automobile according to claim 17, wherein said floor panel includes a foot rest portion on which a driver's foot may be rested and a raised portion for securing the rail in a raised position at the rearward end of said foot rest portion, wherein said lower rail is fixed directly to said raised portion at the forward end thereof so that said upper rail is movable over said foot rest portion, and wherein said end cover includes an elongated aperture in communication with said gap of said lower rail for permitting slidable movement of said upper rail.

19. The seat-sliding device for a front seat of an automobile according to claim 18, wherein the end cover disposed at the front end portion of said lower rail includes a flat portion extending along the axis of said lower rail, and a deflected portion extending along said raised portion.

20. The seat-sliding device for a front seat of an automobile according to claim 19, wherein said flat portion and deflected portion include an elongated aperture for permitting slidable movement of said upper rail therein.

21. The seat-sliding device for a front seat of an automobile according to claim 17, wherein said end cover is formed from a synthetic resin material.

22. A seat-sliding device for a front seat of an automobile comprising:
a vehicle floor surface comprising a floor panel, a soundproof and vibration-proof member mounted on said floor panel, and a surface layer member formed over said soundproof and vibration-proof member;
a cutout opening formed by removing a predetermined portion of said soundproof and vibration-proof member and said surface layer member so as to expose a linear portion of said floor panel;
a linear lower rail inserted into said cutout opening and secured to said exposed linear portion of said floor panel; and
an upper rail slidably inserted into said lower rail and secured to the seat;
wherein said lower rail secured to said floor panel comprises a uniform cross-sectional member having a gap at a central upper portion, wherein said upper rail includes a vertical wall extending upwardly from said gap and adapted to fix the seat at the upper end thereof, and wherein the left and right side of said vertical wall are covered with a pair of upper rail covers positioned longitudinally with respect to the axis of said vertical wall for securing said seat thereto.

23. The seat-sliding device for a front seat of an automobile according to claim 22, wherein said lower rail is provided with a lock plate having a series of lock apertures spaced apart from one another in a direction of seat displacement, said lock plate being integral with said lower rail and extending substantially in parallel with the longitudinal axis of said upper rail, wherein said vertical wall for securing said seat support at one side surface thereof supports a lock member for engagement with and disengagement from said lock apertures, and wherein said at least one of said pair of upper rail covers is formed at the side of lock member with a notch for permitting engagement and disengagement movement of said lock member relative to said lock apertures.

24. The seat-sliding device for a front seat of an automobile according to claim 22, wherein said pair of upper rail covers include engagement portions at opposing position thereon for fixing said pair of upper rail covers, and wherein said vertical wall for securing the seat thereto is formed with a through-hole for permitting passage of said engagement portions.

25. The seat-sliding device for a front seat of an automobile according to claim 24, wherein said engagement portion includes a male protuberance at one of said pair of upper rail covers and a female recess at the other of said pair of upper rail covers, said male protuberance including an enlarged tip portion having a notch so as to provide said enlarged tip portion with flexibility, said female recess including an insert hole for receiving said enlarged tip portion of said male protuberance in a flexed state.

26. The seat-sliding device for a front seat of an automobile according to claim 22, wherein said pair of upper rail covers are in a symmetrical, plate-like configuration, and wherein one of said pair of upper rail covers is provided with an opening for permitting said vertical wall for securing of the seat thereto to protrude upwardly through said opening.

27. The seat-sliding device for a front seat of an automobile according to claim 22, wherein said pair of upper rail covers are formed of a synthetic resin material.

28. The seat-sliding device for a front seat of an automobile comprising:
- a vehicle floor surface comprising a floor panel, a soundproof and vibration-proof member mounted on said floor panel, and a surface layer member formed over said soundproof and vibration-proof member;
- a cutout opening formed by removing a predetermined portion of said soundproof and vibration-proof member and said surface layer member so as to expose a linear portion of said floor panel;
- a linear lower rail inserted into said cutout opening and secured to said exposed linear portion of said floor panel; and
- an upper rail slidably inserted into said lower rail and secured to the seat;
- wherein said upper rail is designed so as to protrude from the rearward end of said lower rail upon displacement of said upper rail toward its rearward most position, wherein said upper rail is provided at the rearward end thereof with a scraper member for scraping out dust in said lower rail.

29. The seat-sliding device for a front seat of an automobile according to claim 28, wherein said lower rail is mounted with a rearward end cover at the rearward end thereof, said rearward end cover including a dust container for receiving dust scraped out of said lower rail by means of said scraper member, said rearward end cover being located in said soundproof and vibration-proof member and said surface layer member.

30. The seat-sliding device for a front seat of an automobile according to claim 28, wherein said rearward end cover includes a flat member extending along said lower rail and wherein said end cover includes a dust container which is integrally provided on a surface of said flat member.

31. The seat-sliding device for a front seat of an automobile according to claim 29, wherein said rearward end cover includes a flat portion extending along said lower rail and wherein said dust container is removably mounted to said flat portion.

32. The seat-sliding device for a front seat of an automobile according to claim 30, wherein said rearward end cover includes an opening for introducing dust scraped out of said lower rail by means of said scraper member into said dust container or for discharging dust collected in said dust container.

33. A seat-sliding device for a front seat of an automobile comprising:
- a soundproof and vibration-proof member and a surface layer member mounted on a floor panel constituting a vehicle floor surface;
- a cutout opening formed by removing said soundproof and vibration-proof member and said surface layer member in linear fashion so as to expose said floor panel;
- a linear lower rail inserted into said cutout opening and secured to said floor panel;
- an upper rail slidably inserted into said lower rail and secured to the seat;
- a vertical wall of said upper rail for fixing the seat to the upper end thereof;
- a lock plate on said lower rail extending substantially in parallel with the axis of said vertical wall;
- a series of lock apertures formed in said lock plate and spaced apart relative to one another along a direction of seat displacement; and
- a lock member supported by said vertical wall for securing of the seat to said vertical wall and adapted for engagement and disengagement relative to said lock apertures.

34. A seat-slide device for a front seat of an automobile comprising:
- a soundproof and vibration-proof member and a surface layer member mounted on a floor panel constituting a vehicle floor surface;
- a cutout opening formed by removing said soundproof and vibration-proof member and said surface layer member in linear fashion so as to expose said floor panel;
- a linear lower rail inserted into said cutout opening and secured to said floor panel; and
- an upper rail slidably inserted into said lower rail and secured to the seat;
- said lower rail being formed by a uniform cross-sectional member having a gap at the upper central portion thereof;
- said upper rail being provided with a vertical wall for fixing the seat to the upper end thereof; and
- said lower rail and a portion of said surface layer member being covered with a pair of lower rail covers longitudinally positioned along the axis of said vertical wall for securing the seat thereto.

35. A seat-sliding device for a front seat of an automobile comprising:
- a soundproof and vibration-proof member and a surface layer member mounted on a floor panel constituting a vehicle floor surface;
- a cutout opening formed by removing said soundproof and vibration-proof member and said surface layer member in linear fashion so as to expose said floor panel;
- a linear lower rail inserted into said cutout opening and secured to said floor panel; and
- an upper rail slidably inserted into said lower rail and secured to the seat; said upper rail being provided with a vertical wall for fixing the seat to the upper end thereof;
- said lower rail being formed by a uniform cross-sectional member having a gap at a central upper portion, said upper rail protruding through said gap; and
- at least one longitudinal end of said lower rail being mounted with an end cover having an elongated aperture in communication with said gap of said lower rail for permitting slidable movement of said upper rail therein.

36. A seat-sliding device for a front seat of an automobile comprising:

a soundproof and vibration-proof member and a surface layer member mounted on a floor panel constituting a vehicle floor surface;

a cutout opening formed by removing said soundproof and vibration-proof member and said surface layer member in linear fashion so as to expose said floor panel;

a linear lower rail inserted into said cutout opening and secured to said floor panel; and an upper rail slidably inserted into said lower rail and secured to the seat, said upper rail being provided with a vertical wall for fixing the seat to the upper end thereof;

said lower rail being formed by a uniform cross-sectional member having a gap at a central upper portion through which said upper rail protrudes; and left and right sides of said vertical wall for securing the seat thereto being covered with a pair of upper rail covers longitudinally positioned along the axis of said vertical wall.

37. A seat-sliding device for a front seat of an automobile comprising:

a soundproof and vibration-proof member and a surface layer member mounted on a floor panel constituting a vehicle floor surface;

a cutout opening formed by removing said soundproof and vibration-proof member and said surface layer member in linear fashion so as to expose said floor panel;

a linear lower rail inserted into said cutout opening and secured to said floor panel; and an upper rail slidably inserted into said lower rail and secured to the seat;

said upper rail being designed so as to protrude from the rearward end of said lower rail when said upper rail is displaced in its most rearward position;

said upper rail being provided with a scraper member, said scraper member adapted to scrape out dust in said lower rail;

said lower rail being mounted with a rearward end cover at the rearward end thereof, said rearward end cover having thereon a dust container for receiving dust scraped out of said lower rail by said scraper member; and said rearward end cover and said lower rail being fixed directly to said floor panel of said vehicle floor surface and being at least partially surrounded by said soundproof and vibration-proof member and said surface layer member.

* * * * *

UNITED STATES PATENT AND TRADEMARK OFFICE
CERTIFICATE OF CORRECTION

PATENT NO. : 5,104,084
DATED : April 14, 1992
INVENTOR(S) : T. KUMAGAI et al.

It is certified that error appears in the above-indentified patent and that said Letters Patent is hereby corrected as shown below:

On the cover, in section [30], "Foreign Application Priority Data", line 1, change "2-26413[u]" to Mar. 16, 1990 [JP] Japan......2.26143[u]

On cover page, item [56], "References Cited", U.S. PATENT DOCUMENTS", line 8, change "296/48.23" to ---296/47.23---.

Signed and Sealed this

Twelfth Day of November, 1996

Attest:

BRUCE LEHMAN

*Attesting Officer*     *Commissioner of Patents and Trademarks*